United States Patent [19]

Tanaka et al.

[11] Patent Number: 5,780,396

[45] Date of Patent: Jul. 14, 1998

[54] SLIDING MEMBER

[75] Inventors: Tadashi Tanaka; Hidehiko Tamura; Takahiro Niwa. all of Nagoya, Japan

[73] Assignee: Daido Metal Company Ltd., Nagoya, Japan

[21] Appl. No.: 590,208

[22] Filed: Jan. 23, 1996

[30] Foreign Application Priority Data

Feb. 1, 1995 [JP] Japan .................... 7-037606

[51] Int. Cl.$^6$ .................... C10M 111/04; C10M 147/02
[52] U.S. Cl. .................... 508/104; 508/105; 508/106
[58] Field of Search .................... 508/104, 105, 508/106

[56] References Cited

U.S. PATENT DOCUMENTS

| | | | |
|---|---|---|---|
| 4,592,782 | 6/1986 | Davies | 508/104 |
| 4,626,365 | 12/1986 | Mori | 508/106 |
| 4,655,944 | 4/1987 | Mori | 508/104 |
| 4,657,683 | 4/1987 | Davies | 508/104 |
| 5,091,098 | 2/1992 | Tanaka et al. | 508/104 |
| 5,364,682 | 11/1994 | Tanaka et al. | 508/106 |
| 5,447,774 | 9/1995 | Tanaka et al. | 508/104 |

FOREIGN PATENT DOCUMENTS 58-28016  2/1983  Japan.

*Primary Examiner*—Ellen M. McAvoy
*Attorney, Agent, or Firm*—Browdy and Neimark

[57] ABSTRACT

A sliding member excellent in cavitation resistance and friction properties which has a sliding surface composed of a resin composition comprising a tetrafluoroethylene-perfluoroalkyl vinyl ether copolymer resin and a polytetrafluoroethylene having a molecular weight of 5,000,000 to 15,000,000 and optionally a solid lubricant, wherein the proportion of the tetrafluoro-ethylene-perfluoroalkyl vinyl ether copolymer resin is 1 to 50% by volume based on the volume of the resin composition and the proportion of the solid lubricant is 0.5 to 10% by volume based on the volume of the resin composition. The addition of the solid lubricant results in an enhancement of friction properties and the use of an exfoliated graphite as the solid lubricant brings about a further enhancement of friction properties.

16 Claims, 2 Drawing Sheets

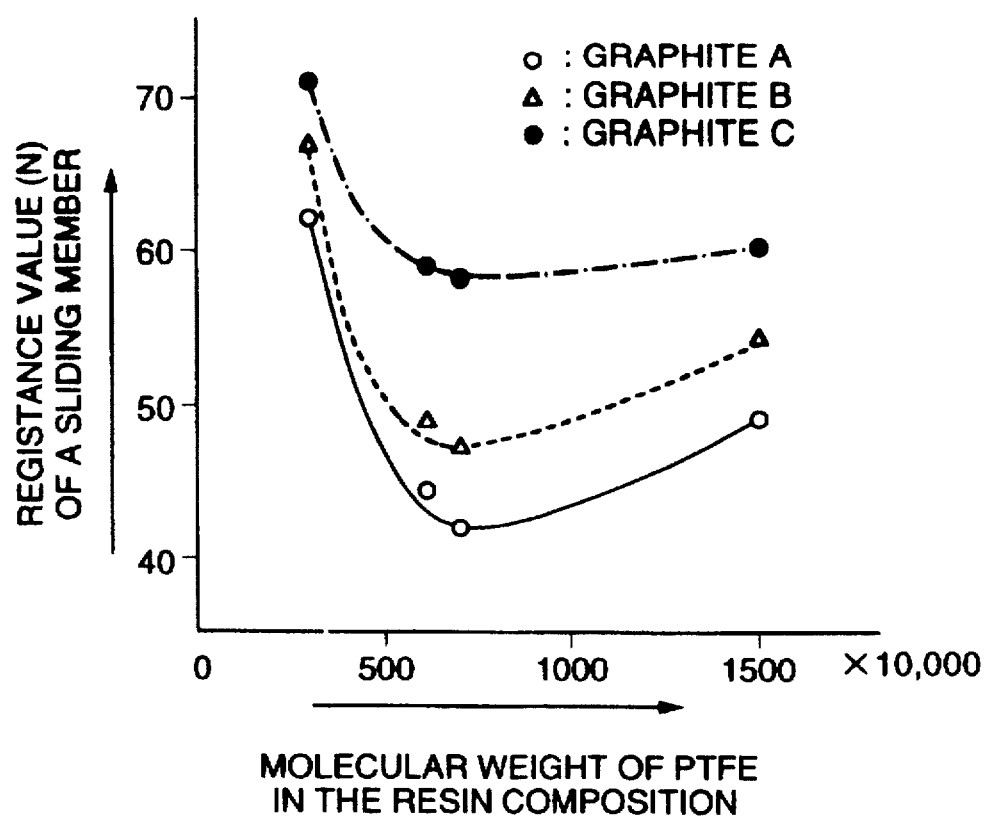

5,780,396

SLIDING MEMBER

BACKGROUND OF THE INVENTION

This invention relates to a sliding member having a sliding surface composed of a resin composition, which sliding member excellent in friction properties, particularly excellent in cavitation resistance.

In the case of a sliding member used in a site in which the pressure fluctuation is severe as in a shock absorber, a diesel engine or the like, it has been considered that the use of a composition excellent in cavitation resistance makes it possible to protect the sliding member from being eroded by cavitation. Sliding members improved in cavitation resistance are disclosed in Japanese Patent Application Kokai No. 58-28,016 (JP-A 58(1983)-28,016), which describes a multilayer sliding member in which a composition composed of 0.1 to 50% by volume, based on the volume of the composition, of a tetrafluoroethylene-perfluoroalkyl vinyl ether copolymer resin (referred to hereinafter as PFA) and the balance which is substantially a polytetrafluoroethylene (referred to hereinafter as PTFE) is coated on the surface of a metal layer backed with a backing metal.

However, the above multilayer sliding member is not satisfactory in friction properties. In particular, not only the friction coefficient thereof at the time of driving is not sufficiently small, but also, when it is used as a bearing for a rotating shaft, the starting friction coefficient thereof at the time of starting is not sufficiently small and when it is used as a reciprocating sliding member such as shock absorber or the like, the friction coefficient thereof where the reciprocating motion is turned at both ends of the motion is also not sufficiently small. Therefore, a further improvement of said friction coefficient has been desired.

The present inventors have found by trial and error that the friction properties are improved by increasing the molecular weight of PTFE to 5,000,000 or more, whereas the molecular weight of the conventional PTFE was about 3,000,000.

SUMMARY OF THE INVENTION

An object of this invention is to provide a sliding member which is excellent in friction properties as well as cavitation resistance.

Another object of this invention is to provide a sliding member having a sliding surface composed of a resin composition comprising a PTFE having a molecular weight of at least 5,000,000.

A further object of this invention is to provide a multilayer sliding member excellent in friction properties in which a low friction resin composition comprising a PTFE having a molecular weight of at least 5,000,000 is coated on the surface of a metal layer backed with a backing metal.

Other objects and advantages of this invention will become apparent from the following description.

According to this invention, there is provided a sliding member having a sliding surface composed of a resin composition comprising a tetrafluoroethyleneperfluoroalkyl vinyl ether copolymer resin and a polytetrafluoroethylene having a molecular weight of 5,000,000 to 15,000,000, wherein the proportion of the tetrafluoroethyleneperfluoroalkyl vinyl ether copolymer resin is 1 to 50% by volume based on the volume of the resin composition.

This invention also provides a multilayer sliding member in which the above resin composition is coated on the surface of a metal layer backed with a backing metal.

BRIEF DESCRIPTION OF THE DRAWING

FIG. 3 is a graph showing the relation between the molecular weight of PTFE in the resin composition and the resistance value of a sliding member in the reciprocating sliding test.

DETAILED DESCRIPTION OF THE INVENTION

Figure 1:
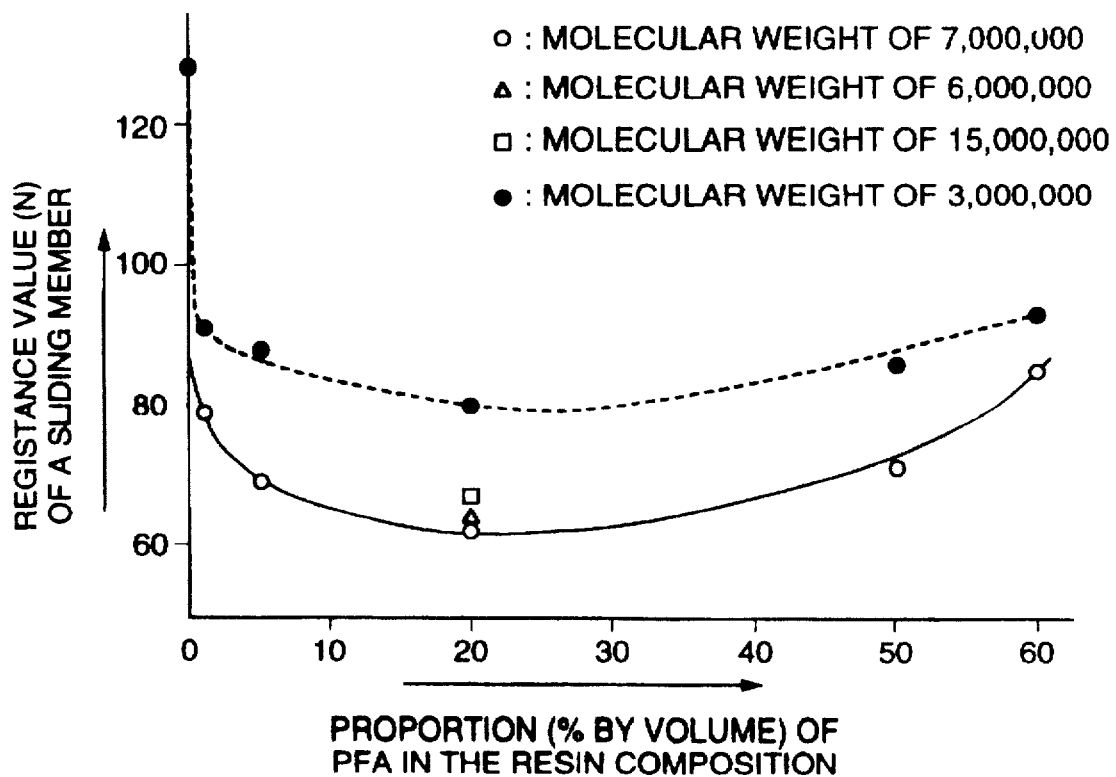
FIG. 1 is a graph showing the relation between the proportion (% by volume) of PFA in the resin composition of which the sliding surface of a sliding member is composed and the resistance value of the sliding member in a reciprocating sliding test.

The sliding member of this invention has a sliding surface composed of a resin composition which comprises a PFA and a PTFE having a molecular weight of 5,000,000 to 15,000,000, the proportion of the PFA being 1 to 50% by volume, based on the volume of the resin composition.

The PFA is superior in bonding strength to PTFE to other fluoroplastics and when the proportion of PFA is less than 1% by volume, the addition effect thereof is insignificant and the desired friction properties and cavitation resistance are not obtained. On the other hand, when the proportion of PFA is more than 50% by volume, PFA becomes the main constituent and the desired friction properties are deteriorated though the cavitation resistance is enhanced. Therefore, it is necessary that the proportion of PFA should be 1 to 50% by volume based on the volume of the resin composition.

The PTFE has a molecular weight of 5,000,000 to 15,000,000. When the molecular weight is less than 5,000,000 or more than 15,000,000, the enhancement of friction properties is not desired. In particular, a PTFE having a molecular weight of 6,000,000 to 10,000,000 is preferred because the friction properties become excellent. In this invention, the friction properties are further improved by adding to the above resin composition 0.5 to 10% by volume of a solid lubricant based on the volume of the resin composition.

The solid lubricant includes carbon type solid lubricants such as graphite, graphite fluoride, carbon and the like; metal lubricants each consisting of a metal such as Pb, Sn, Cu, Zn or the like or an alloy thereof; metal fluorides such as $PbF_2$, $AlF_3$, $CaF_2$ and the like. The carbon type solid lubricants are preferable and graphite per se is particularly preferable.

When the amount of the solid lubricant is less than 0.5% by volume, no addition effect thereof is obtained. When the amount is more than 10% by volume, the friction properties are rather gradually deteriorated as the amount increases. Hence, it is necessary that the amount of the solid lubricant should be 0.5 to 10% by volume. In particular, an amount of the solid lubricant of 0.5 to 7.5% by volume is desirable because the friction properties are better. When the sliding member is used in a lubricating oil and exfoliated graphite is added as the solid lubricant to the resin composition, the excellent oil-retainability thereof further enhances the friction properties. It is preferable that the exfoliated graphite has a larger oil-absorption; however, when the oilabsorption is more than 150 ml/100 g, the particle size of the graphite becomes too large, and hence, the dispersibility of the graphite becomes low. Therefore, the oil-absorption of the graphite is preferably 80 ml to 150 ml per 100 g of the graphite.

The sliding member of this invention has a sliding surface composed of the above-mentioned resin composition, and may be composed of the resin composition alone or may be prepared by coating the resin composition on the surface of a metal layer backed with a backing metal. When the resin composition is coated on the surface of the metal layer backed with a backing metal, a multilayer sliding member is obtained which is suitable to, for example, a shock absorber. In the case of the multilayer sliding member, it is possible to form a porous metal layer on the surface of a backing metal and impregnate and coat the porous surface with the resin composition to form the multilayer sliding member. In this sliding member, as the backing metal, copper-plated steel is mainly used. However, the steel may be replaced by another metal and the copper-plating may be replaced by a copper-alloy-plating or another metal-plating. An unplated metal may also be used as the backing metal. The porous metal layer may be composed of a copper alloy such as bronze or the like or another metal or alloy and can be formed by sintering a copper alloy powder or another metal or alloy powder on the backing metal.

As explained above, according to this invention, there can be obtained a sliding member excellent in cavitation resistance and friction properties from the resin composition. According to this invention, a multilayer sliding member excellent in cavitation resistance and friction properties can also be obtained by coating the resin composition on the surface of a metal layer backed with a backing metal.

DESCRIPTION OF THE PREFERRED EMBODIMENTS

Examples of this invention are compared with Comparative Examples to explain this invention in more detail hereinafter. For knowing the effect of this invention, test pieces for Examples and Comparative Examples were prepared and subjected to a cavitation test, a friction test and a reciprocating sliding test. The test samples for Examples and Comparative Examples were prepared by spreading a lead-bronze powder in a thickness of 0.3 mm on a copper-plated steel backing having a thickness of 1.7 mm, sintering the powder to form a porous lead-bronze layer, coating a sliding resin composition on the surface of the porous lead-bronze layer, pressing the resulting assembly between rolls to impregnate and coat the porous lead-bronze layer with the resin composition, baking the resulting assembly at a temperature of 350 to 400° C. in a reducing atmosphere and then passing the assembly between rolls to make the thickness uniform.

In the above sliding resin composition, there were used AD1 (a trade name of Asahi Glass Co., Ltd. for a PTFE having a molecular weight of 3,000,000); AD950 (a trade name of Asahi Glass Co., Ltd. for a PTFE having a molecular weight of 6,000,000); AD660 (a trade name of Asahi Glass Co., Ltd. for a PTFE having a molecular weight of 7,000,000); and AD936 (a trade name of Asahi Glass Co., Ltd. for a PTFE having a molecular weight of 15,000,000) as the PTFE.

As the PFA, there were used PFA340J (a trade name of Mitsui-DuPont Co., Ltd.). This PFA had a low melt viscosity and was excellent in bonding strength to PTFE.

As the graphite, three kinds of graphite manufactured by Nippon Kokuen Kabushiki Kaisha were used, namely exfoliated graphite having an oil-absorption of 150 ml/100 g (referred to hereinafter as Graphite A), exfoliated graphite having an oil-absorption of 80 ml/100 g (referred to hereinafter as Graphite B) and natural graphite having an oil-absorption of 50 ml/100 g (referred to hereinafter as Graphite C) were used to prepare three types of test samples.

First of all, the test samples for Comparative Examples 1 to 8 and Examples 1 to 6 shown in Table 1 were subjected to a cavitation test. The cavitation test was conducted under the test conditions shown in Table 2 and the samples were weighed before and after the test. From the weight difference, the reduced volume ($cm^3$) was calculated. The results obtained are shown in Table 3.

TABLE 1

| | PFA (% by vol.) | PTFE (% by vol.) Molecular weight ($\times 10^4$) | | | |
|---|---|---|---|---|---|
| | | 300 | 600 | 700 | 1500 |
| Comp. Ex. 1 | | 100 | | | |
| Comp. Ex. 2 | 1 | 99 | | | |
| Comp. Ex. 3 | 5 | 95 | | | |
| Comp. Ex. 4 | 20 | 80 | | | |
| Comp. Ex. 5 | 50 | 50 | | | |
| Comp. Ex. 6 | 60 | 40 | | | |
| Comp. Ex. 7 | | | | 100 | |
| Comp. Ex. 8 | 60 | | | 40 | |
| Example 1 | 1 | | | 99 | |
| Example 2 | 5 | | | 95 | |
| Example 3 | 20 | | | 80 | |
| Example 4 | 50 | | | 50 | |
| Example 5 | 20 | | 80 | | |
| Example 6 | 20 | | | | 80 |

TABLE 2

| Cavitation test conditions | |
|---|---|
| Tester used | Exclusive tester for cavitation |
| Size of sample | Longitudinal Length 40 × Lateral Length 40 × Thickness 2.0 (mm) |
| Resonant frequency | 19 (KHz) |
| Output | 600 (W) |
| Test liquid | Water |
| Test temperature | Room temperature |
| Gap between horn and test sample | 1 (mm) |
| Amplitude of horn | 45 to 50 (μm) |
| Test time | 5 (min) |

TABLE 3

| | Reduced vol. $\times 10^{-3}$ ($cm^3$) | Friction coefficient $\times 10^{-2}$ | Resistance value (N) |
|---|---|---|---|
| Comp. Ex. 1 | 8.5 | 10 or more | 124 |
| Comp. Ex. 2 | 3.9 | 2.2 | 91 |
| Comp. Ex. 3 | 3.7 | 2.0 | 84 |
| Comp. Ex. 4 | 2.8 | 1.6 | 80 |
| Comp. Ex. 5 | 1.5 | 2.1 | 86 |
| Comp. Ex. 6 | 1.2 | 4.3 | 93 |
| Comp. Ex. 7 | 8.1 | 10 or more | 103 |
| Comp. Ex. 8 | 1.4 | 3.9 | 85 |
| Example 1 | 3.7 | 1.8 | 79 |
| Example 2 | 3.5 | 1.5 | 69 |
| Example 3 | 2.9 | 1.1 | 62 |
| Example 4 | 1.7 | 1.8 | 71 |
| Example 5 | 2.7 | 1.1 | 64 |
| Example 6 | 3.0 | 1.3 | 67 |

As shown in Comparative Examples 1 to 8 and Examples 1 to 4, there is a tendency that the reduced volume decreases as the volume % of the PFA increases. In Comparative Examples 2 to 6 in which the molecular 5 weight of PTFE is 3,000,000 and Examples 1 to 4 and Comparative Example 8 in which the molecular weight of PTFE is 7,000,000, there is no remarkable differences in reduced volume due to the difference in the molecular weight of PTFE when the Examples and Comparative Examples 10 in which the PFA volume % is the same are compared. Similarly, there is no remarkable differences in reduced volume due to the difference in the molecular weight of PTFE when Comparative Example 4 and Examples 3, 5 and 6 in which the amount of PFA added was 20% by volume are compared. From this fact, it is seen that the difference in molecular weight of PTFE little affects the cavitation resistance.

Subsequently, the above test samples were subjected to a friction test under the conditions shown in Table 4 to determine the friction coefficients of the samples. The results obtained are shown in Table 3.

TABLE 4

| Friction test conditions | |
| --- | --- |
| Tester used | Thrust washer type friction tester |
| Size of sample | Longitudinal Length 40 × Lateral Length 40 × Thickness 2.0 (mm) |
| Load | 10 (MPa) |
| Peripheral speed | 0.5 (m/sec) |
| Test time | 4 (hrs) |
| Lubricanting oil | Oil for shock absorber |

As shown in Comparative Examples 1 to 8 and Examples 1 to 4, the friction coefficient was greatly lowered by adding 1% by volume of PFA, and the smallest friction coefficient was obtained when 20% by volume of PFA was added. In Comparative Examples 6 and 8 in which the amount of PFA added is 60% by volume, the friction coefficients were $4.3\times10^{-2}$ and $3.9\times10^{-2}$, respectively, which means that when the amount of PFA added exceeds 50% by volume, the friction coefficient is increased again. Similarly, the comparison of Comparative Example 4 and Examples 3, 5 and 6 in which the amount of PFA added was 20% by volume indicates that the friction coefficient in Examples 3 and 5 is $1.1\times10^{-2}$, namely the smallest, and the friction coefficient in Example 6 in which the molecular weight of PTFE was 15,000,000 is rather slightly increased.

Subsequently, a reciprocating sliding test was conducted under the conditions shown in Table 5, and the results obtained are shown as resistance value (N) in Table 3 and FIG. 1.

TABLE 5

| Reciprocating sliding test conditions | |
| --- | --- |
| Tester used | Reciprocating sliding tester |
| Sample size | 41 mm in inner diameter × 20 mm in width × 2.0 mm in thickness |
| Load | 1,000 (N) |
| Peripheral speed | 0.01 (m/sec) |
| Lubricanting oil | Oil for shock absorber |

As shown in Comparative Examples 1 to 8 and Examples 1 to 4, the resistance value is greatly lowered by the addition of PFA, and in Comparative Example 4 and Example 3 in which the amount of PFA added was 20% by volume, the resistance value (N) is the smallest, respectively. In Comparative Examples 6 and 8 in which the amount of PFA added was 60% by volume, the resistance values (N) are 93 and 85, respectively. This means that when the amount of PFA added exceeds 50% by volume, the resistance value increases again. In Comparative Examples 2 to 6 in which the molecular weight of PTFE was 3,000,000 and Examples 1 to 4 and Comparative Example 8 in which the molecular weight of PTFE was 7,000,000, the cases in which the amount of PFA added was the same are compared with each other, it is clear that when the molecular weight of PTFE is 7,000,000, the resistance value is smaller than the other and the friction properties are better than the other. Similarly, the comparison of Comparative Example 4 and Examples 3, 5 and 6 in which the amount of PFA added was 20% by volume indicates that when the molecular weight of PTFE is 7,000,000, the resistance value is the smallest and when the molecular weight of PTFE becomes 15,000,000, the resistance value rather slightly increases.

Figure 2:
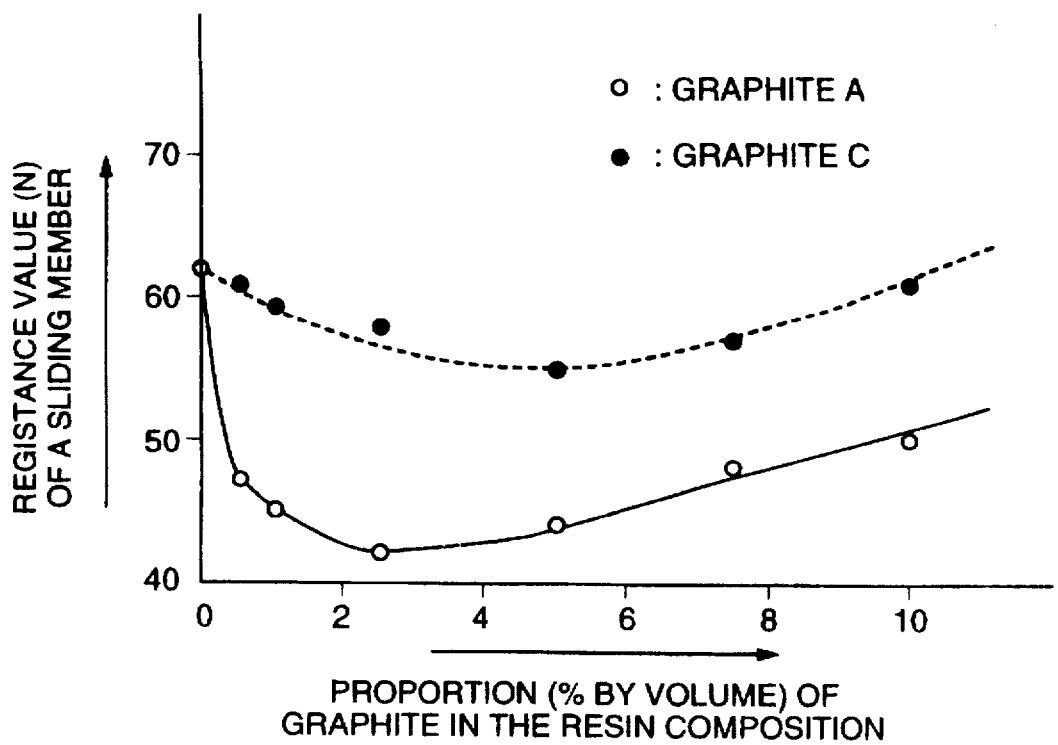
FIG. 2 is a graph showing the relation between the proportion (% by volume) of graphite in the resin composition and the resistance value of a sliding member in the reciprocating sliding test.

For investigating the effect of addition of a solid lubricant, samples in Examples 7 to 18 and Comparative Examples 9 and 10 in which a composition consisting of 20% by volume of PFA, the graphite in the amount shown in Table 6 and the balance of PTFE having a molecular weight of 7,000,000 was used were prepared. In this case, samples in which as the graphite, Graphite A (oil-absorption: 150 ml/100 g) and Graphite C (oil-absorption: 50 ml/100 g) were used were subjected to a friction test and a sliding test. The results obtained are shown in Table 6 and FIG. 2.

TABLE 6

|  | Graphite (vol. %) | | Friction coefficient | Resistance value |
| --- | --- | --- | --- | --- |
|  | A | C | ×10⁻² | (N) |
| Comp. Ex. 9 |  | 15 | 2.8 | 68 |
| Comp. Ex. 10 | 15 |  | 2.5 | 62 |
| Example 7 |  | 0.5 | 1.8 | 61 |
| Example 8 |  | 1 | 1.3 | 59 |
| Example 9 |  | 2.5 | 1.0 | 58 |
| Example 10 |  | 5 | 1.2 | 55 |
| Example 11 |  | 7.5 | 1.4 | 57 |
| Example 12 |  | 10 | 1.7 | 61 |
| Example 13 | 0.5 |  | 1.5 | 47 |
| Example 14 | 1 |  | 1.1 | 45 |
| Example 15 | 2.5 |  | 0.8 | 42 |
| Example 16 | 5 |  | 1.1 | 44 |
| Example 17 | 7.5 |  | 1.2 | 48 |
| Example 18 | 10 |  | 1.5 | 50 |

Note:
The composition contained 20% by volume of PFA and the balance of PTFE having a molecular weight of 7,000,000.

From the above results, it is clear that when the graphite is added, the friction coefficient and resistance value becomes small. In particular, it can be seen that when the graphite is added in an amount of 0.5 to 10% by volume, the friction coefficient and resistance value become small, and when the graphite is added in an amount exceeding 10% by volume, the friction coefficient and resistance value are increased and the friction properties are damaged. Also, Graphite A having a large oil-absorption indicates smaller friction coefficient and resistance value than Graphite C having a smaller oil-absorption.

Moreover, in order to know the effect of the oil-absorption of graphite, a composition consisting of 20% by volume of PFA, 2.5% by volume of Graphite A, B or C and 77.5% by volume of PTFE having a molecular weight of 3,000,000; 6,000,000; 7,000,000; or 15,000,000 was prepared as shown as Examples 19 to 27 and Comparative Examples 11 to 13 in Table 7 and subjected to a reciprocating sliding test under the conditions shown in Table 5 to obtain the results shown in Table 7 and FIG. 3.

TABLE 7

|  | Molecular weight of PTFE (×10⁴) | Kind of graphite | Resistance value (N) |
| --- | --- | --- | --- |
| Comp. Ex. 11 | 300 | A | 62 |
| Comp. Ex. 12 | 300 | B | 67 |
| Comp. #x. 13 | 300 | C | 71 |
| Example 19 | 600 | A | 44 |
| Example 20 | 600 | B | 49 |
| Example 21 | 600 | C | 59 |
| Example 22 | 700 | A | 42 |
| Example 23 | 700 | B | 47 |
| Example 24 | 700 | C | 58 |
| Example 25 | 1500 | A | 49 |
| Example 26 | 1500 | B | 54 |
| Example 27 | 1500 | C | 60 |

Note:
The composition contained 20% by vol. of PFA, 2.5% by vol. of graphite and 77.5% by vol. of PTFE having a molecular weight of 7,000,000.

From the results shown in Table 7, it can be seen that by adding an exfoliated graphite having a large oil-absorption, the resistance value becomes lower and the friction properties are excellent.

What is claimed is:

1. A sliding member having a sliding surface which is composed of a resin composition comprising a tetrafluoroethylene-perfluoroalkyl vinyl ether copolymer resin and a polytetrafluoroethylene having a molecular weight of 5,000,000 to 15,000,000, the proportion of the tetrafluoroethylene-perfluoroalkyl vinyl ether copolymer resin being 1 to 50% by volume based on the volume of the resin composition.

2. The sliding member according to claim 1, wherein the balance of the resin composition is substantially the polytetrafluoroethylene having a molecular weight of 5,000,000 to 15,000,000.

3. The sliding member according to claim 2, wherein the molecular weight of the polytetrafluoro-ethylene is 6,000,000 to 10,000,000.

4. The sliding member according to claim 1, wherein the resin composition further comprises a solid lubricant and the proportion of the solid lubricant is 0.5 to 10% by volume based on the volume of the resin composition.

5. The sliding member according to claim 4, wherein the proportion of the solid lubricant is 0.5 to 7.5% by volume based on the volume of the resin composition.

6. The sliding member according to claim 4, wherein the balance of the resin composition is substantially the polytetrafluoroethylene having a molecular weight of 5,000,000 to 15,000,000.

7. The sliding member according to claim 6, wherein the molecular weight of the polytetrafluoroethylene is 6,000,000 to 10,000,000.

8. The sliding member according to claim 4, wherein the solid lubricant is a carbon type solid lubricant, a metal lubricant or a metal fluoride.

9. The sliding member according to claim 8, wherein the solid lubricant is exfoliated graphite.

10. The sliding member according to claim 9, wherein the oil-absorption of the exfoliated graphite is 80 ml to 150 ml per 100 g of the exfoliated graphite.

11. The sliding member according to claim 1, which is a multilayer sliding member wherein the resin composition is coated on the surface of a metal layer backed with a backing metal.

12. The sliding member according to claim 11, wherein the backing metal is copper-plated steel.

13. The sliding member according to claim 11, wherein the metal layer is porous.

14. The sliding member according to claim 13, wherein the metal layer is a porous lead-bronze layer.

15. The sliding member according to claim 1, which is a sliding member composed of the resin composition alone.

16. The sliding member according to claim 5, wherein the balance of the resin composition is substantially the polytetrafluoroethylene having a molecular weight of 5,000,000 to 15,000,000.

* * * * *